Figure 1:
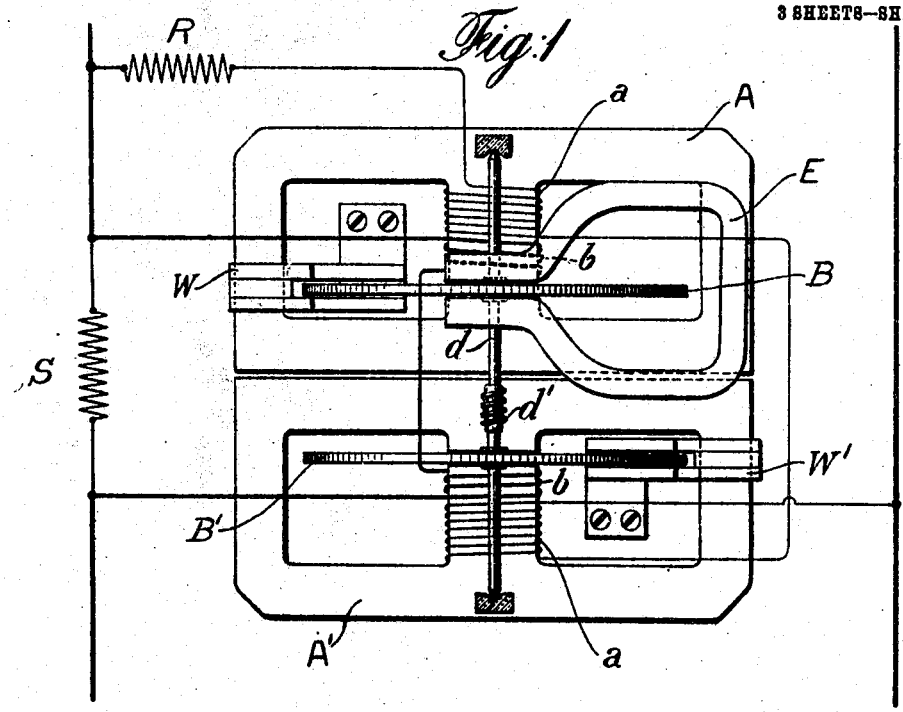

W. STANLEY.
ALTERNATING CURRENT APPARATUS.
APPLICATION FILED NOV. 23, 1905.

941,467.

Patented Nov. 30, 1909.

3 SHEETS—SHEET 1.

W. STANLEY.
ALTERNATING CURRENT APPARATUS.
APPLICATION FILED NOV. 23, 1905.
941,467.  Patented Nov. 30, 1909.
3 SHEETS—SHEET 3.
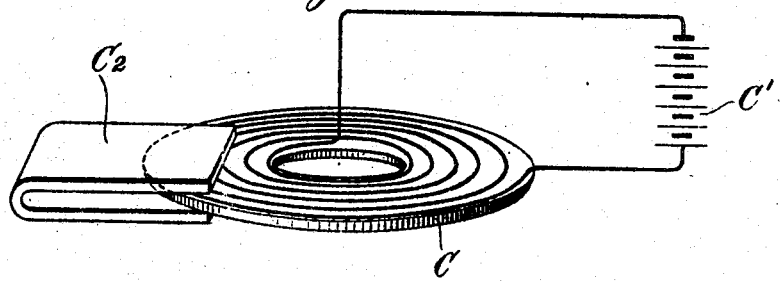
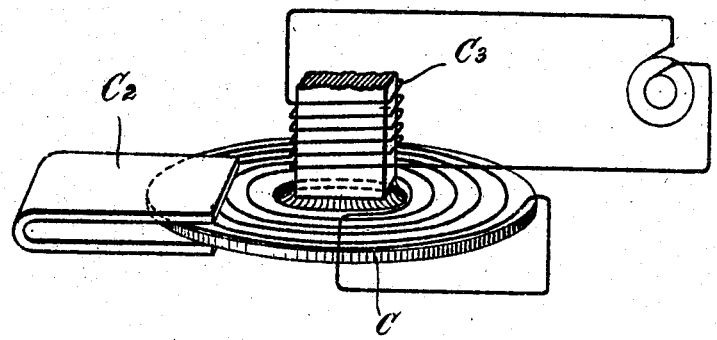
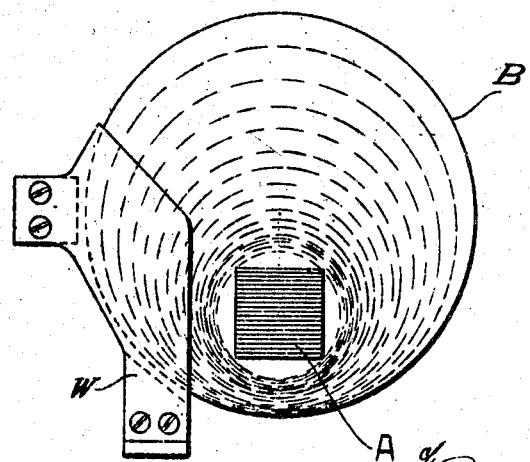

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ALTERNATING-CURRENT APPARATUS.

941,467.             Specification of Letters Patent.       Patented Nov. 30, 1909.

Application filed November 23, 1905. Serial No. 288,643.

*To all whom it may concern:*

Be it known that I, WILLIAM STANLEY, a citizen of the United States, residing at Great Barrington, Massachusetts, have invented certain new and useful Improvements in Alternating-Current Apparatus, of which the following is a full, clear, and exact description.

My invention relates to apparatus actuated by alternating currents. It has been especially devised for the purpose of operating instruments for the measurement of alternating currents and the power or energy which they convey, although it may be used for the transmission of power and other purposes.

One object of my invention relates to the provision of a motive device operating upon novel torque producing principles. The operation of this device is due to the torque effects developed by currents induced within one of its members by another. It, however, does not operate, and such torque is not produced, in the manner heretofore known in the art. The reactive effects resulting in torque in all motive devices heretofore known take place between the currents induced in, for example, the rotor of the device and the impressed field or fields generating them. As well known, this reaction is proportional to the product of the induced current, the impressed field or fields and a function of the angle between them. In my device the torque produced is exerted by the reaction of the induced current upon the field which it itself produces, and is therefore proportional to the square of such induced current, the impressed field serving only as a means for introducing or supplying the currents from one member of the machine to another.

The torque producing reaction in my invention takes place between the current induced in the secondary element and a magnetic circuit of low reluctance placed in inductive relation to it whereby the secondary current causes a strong local field to be produced and reacts upon the same according to the law that a circuit conveying a current tends to so dispose itself as to produce a maximum field or flux. My motive device, therefore, consists essentially of a primary magnet inducing secondary currents in a closed circuit armature, and a magnetic circuit of low reluctance at one side of the primary magnet attracting these secondary currents. The only function of the primary magnet is to constantly produce a suitable value of secondary currents at the proper place in the armature. The flux produced by the primary magnet does not enter into the reactions producing torque in the device.

The advantages derived from a motive device constructed upon this principle are that the torque produced is independent of the phase relation of the induced current to that of the impressed field, which relation limits the value of torque found in motor devices of the prior art. With this device, therefore, I may produce a torque or turning effort when the device is at rest superior to that obtained by the reactions taking place between phase differing fields and the secondary currents which they produce, for the reason that I may induce secondary currents of greater value upon or within the movable element and obtain from them their full torque producing value.

Because the torque developed is due to the reaction of the induced currents upon the field which they produce, it necessarily follows that such reaction is proportional to the square of the induced currents in contradistinction to the reaction taking place in known induction motive devices between an induced current and the field or fields that produce it, in which case such reaction is in simple proportion to the value of the induced currents. My device, therefore, has a high torque coefficient.

In applying my invention to devices such as alternating current wattmeters where the torque produced should be in simple proportion to the variations of the E. M. F. and current in the circuit, I employ two motive devices such as above described, whose moving elements are mechanically connected together, and so arranged as to have no mutual reactive effect upon one another. It is well known that mechanical strains such as cause torque, developed by the reaction of forces upon themselves or one of their components, are proportional to the square of the force. Thus, a magnet attracting its armature exerts a force upon it proportional to the square of the flux present, and, similarly, the torque produced by the motive device here shown is proportional to the square of the energizing flux. In order therefore that my device may produce a torque proportional to the value of its energizing currents, a condition necessary when it is used to measure the energy of an electrical circuit, I cause two inducing magnets to act upon two independent secondary circuits mechanically connected together and arranged to produce opposing torques, and I construct the inducing member of each motor device with two windings arranged and connected in such a manner that the currents traversing the windings of one member set up M. M. F.'s assisting each other, while the same currents traversing the windings of the other member cause M. M. F.'s that oppose one another. As the torques produced by the two motive devices are proportional to the square of the sum of the M. M. F.'s of the one and the square of the difference of the M. M. F.'s of the other, the resultant torque exerted on the staff of the instrument is proportional to the difference of such squares and therefore is proportional to the product of the currents in the two circuits. In this arrangement when a suitable retarding force is provided the rate of rotation is proportional to the energy in the circuit and the device becomes a wattmeter. This part of my invention does not necessarily involve the employment of my attraction motive device, but is applicable to other types of motive devices which involve torque reactions proportional to the square of the impressed flux, but in any case to directly measure the true energy of the circuit at all times, this part of my invention involves certain features that must be included in the device.

In order that the torque of the meter shall be proportional to the true energy dissipated upon the circuit to which it is attached, it is necessary that such torque should be proportional to the E. M. F. and current in the circuit and the cosine of their phase difference, since the maximum and minimum fluxes developed in the two motors employed are greatest when the energizing currents are in phase; the resultant torque due to the difference of value of their fluxes is also greatest under these conditions. This condition of coincidence is that which is also found when the energy delivered to the circuit is maximum, while on the other hand, the energy in circuit is zero when the current in the series energizing circuit is in quadrature with the current in the shunt circuit, under which condition the resultant torque of the two motors is also zero as there is no difference of values of the fluxes of the two magnets. In my device this proportionality between the torque exerted by the motor and the flow of energy in circuit is brought about by reason of the entire independence of the two torque reactions.

Figure 2:
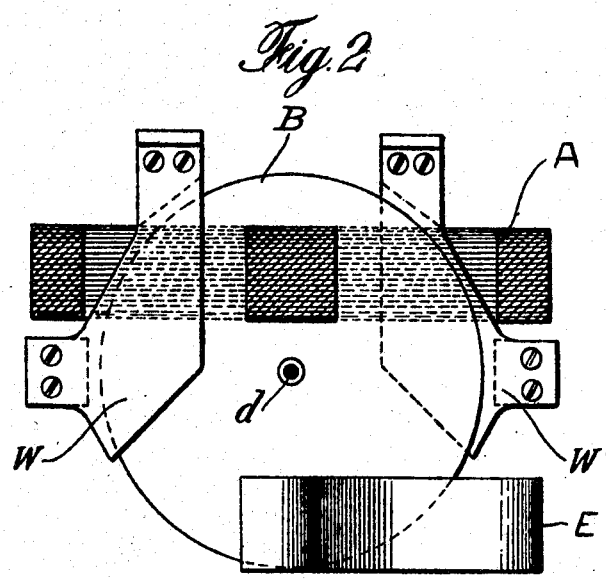
Figure 3:
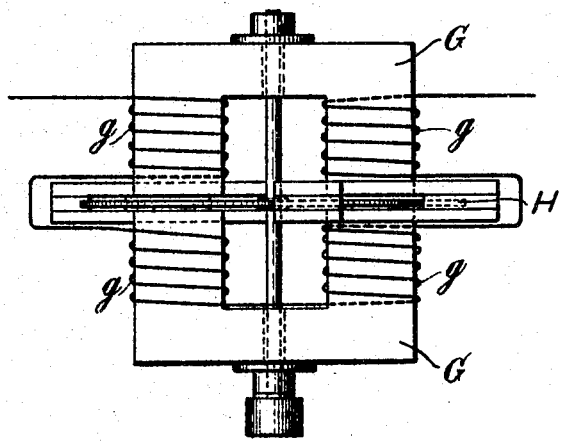
Figure 4:
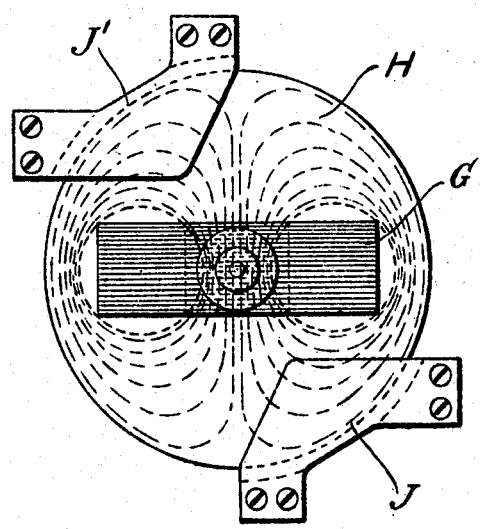

Referring to the drawings accompanying the specification, Figures 1 and 2 represent in side elevation and plan view, respectively, a meter embodying the various features of my invention; Figs. 3 and 4 show in side elevation and plan view, respectively, a motor embodying my invention. Figs. 5, 6 and 7 are diagrammatic views explanatory of some of the principles of operation of my motive device.

A is a primary magnet and B is a rotor consisting of a conducting disk, preferably of copper or aluminum, in inductive relation to the magnet. The magnet is energized by currents in the coils $a$ and $b$ which are connected one in shunt to and the other in series with the circuit. The pole of the magnet is symmetrically disposed on a radius of the armature disk, the currents induced in the disk, arrange themselves symmetrically about the figure of the pole, as indicated in dotted lines in Fig. 7, so that there is no tendency of movement of the disk by reason of any reaction occurring between the induced currents and flux of the magnet A.

W represents an iron wing constituting a circuit of low magnetic reluctance closed outside the armature disk placed at one side of and in non-inductive relation to the pole of the magnet A and closely adjacent to the armature disk. This member W forms in effect an armature or path through which the flux produced by the secondary currents at one side of the pole passes.

So far I have only described a portion of the elements shown in Figs. 1 and 2, because these elements involve a novel mode of operation of my invention and in themselves constitute a motive device. This mode of operation may be understood by reference to Figs. 5 to 7, which are merely explanatory diagrams.

In Fig. 5 I have shown a coil C receiving current from a source of electricity, as for example, the battery C'. This coil is embraced at one side by a piece of iron $C^2$. When current is passed through the coil C it tends to move between the legs of the iron member $C^2$ so as to become as nearly symmetrical therewith as possible and decrease the magnetic reluctance of the coil as much as possible, in accordance with the well known law that a conductor carrying current tends to dispose itself so as to produce the maximum magnetic flux. The force acting to move the coil is proportional to the square of the current in it. It is immaterial to this action what means are provided to introduce the current into the coil or whether such current is a direct current or an alternating one. Thus in Fig. 6 the same coil and iron are shown, but instead of the battery C' providing a direct current an electro-magnet $C^3$ energized by an alternating current is shown projecting its flux through the coil. The flux from this magnet induces an alternating current in the coil C, which coil is in this case shown as closed at its ends, thus constituting a closed circuit. The same law of attraction applies. The coil tends, for the same reason as before, to move between the legs of the adjacent iron. In this case the electro-magnet in inductive relation to the coil C performs the same function as the battery and its connections in Fig. 5. The coil of the magnet and the coil C constitute the primary and secondary circuits of a transformer the latter receiving the current by induction from the first, while the movement of the coil is brought about by the reaction of the current within it upon the field which it produces in the magnetic circuit $C^2$ of low reluctance.

Again in Fig. 7, in which the magnet disk and circuit of low magnetic reluctance of my motive device are illustrated, the alternating current in the primary coil of the magnet A induces secondary currents within the movable conductor B which are attracted by the iron wing W exactly as the coils of Figs. 5 and 6 are attracted. In this figure, however, there is no individual secondary circuit or coil which may be moved bodily and thus cause a change of induction relative to the inducing magnet, but the secondary member being a disk, and therefore a continuous conductor, causes successive secondary circuits to successively present themselves to the induction of the primary element and to the attraction of the member of low magnetic reluctance.

Thus in Fig. 7 the induced currents are indicated by the lines symmetrically arranged with reference to the figure of the pole. The attraction of these currents toward the wing W rotates the disk continuously toward that wing, but the induced currents are being constantly reproduced in the same position relatively to the inducing pole and wing W and are being constantly attracted by the wing. The motor reaction is, therefore, dependent entirely upon the reaction between the induced currents and their own field, and the torque produced is, proportional to the square of these currents.

The magnet A, rotor disk B and wing W of Figs. 1 and 2, therefore, coact in the above manner. The energizing coils of the magnet A are in these figures shown as composed of the two coils $a\;b$, the former being in shunt to the consumption circuit, and the latter being a coil in series in that circuit. These coils are super-imposed upon the same core and so produce a single flux.

So far as the operation of the parts thus far described as a motive device is concerned, it is immaterial whether the energizing winding is made up of such coils or only a single coil. In order that the device may accurately measure electrical energy, however, it is necessary that its torque be composed of components proportional respectively to the E. M. F. and the current in circuit, and, that these components shall further be proportional to the phase relation of the current to its E. M. F. This I have accomplished by combining two motive devices such as I have so far described, arranged to produce opposing torques and with their energizing circuits so arranged and connected that the resultant torque of the two motive devices will be proportional to the energy consumed in the circuit.

A' is a second magnet energized by the coils $a$ and $b$ exactly similar to the coils $a$ and $b$ on the magnet A, but the coils on magnet A' are wound or connected so that their magnetizing actions oppose one another while the coils on magnet A are wound or connected so that their magnetizing actions assist each other.

When the currents in the circuits $a$ and $b$ are in phase the fluxes in the magnets A and A' are respectively proportional to the arithmetical sum and difference of these currents. When the currents in $a$ and $b$ do not coincide in phase the fluxes in the magnets are respectively proportional to the vector sums of such currents in a manner well understood in the art.

B' is a closed circuit armature in exactly the same inductive relation to magnet A', as is the armature B with reference to magnet A.

W' is a path of low magnetic reluctance placed at the opposite side of the magnet A', relatively to the position occupied by the wing W with respect to magnet A.

The armature disks B and B' are connected by the shaft $d$, carrying a worm $d'$, which may actuate any suitable counting mechanism.

E represents a permanent magnet which embraces the disk B in order to retard the same, as has been customary in meter devices in order that the speed of the rotor shall be proportional to its torque.

In order that the meter as thus constituted should accurately record the watts or energy consumed in the work circuit, the circuits in the coils $a$ and $b$ should be of the same phase when there is no lag in the current of the work circuit and the two torque producing reactions must be entirely independent of each other. When this is the case the torque produced by the magnet A upon its disk is proportional to $(a+b)^2$ and the torque produced by the magnet A' upon its disk is equal to $(a-b)^2$. The difference between these opposing torques is equal to $(a+b)^2-(a-b)^2=4ab$.

In order that the currents in the coils $a$ and $b$ shall be of the same phase when there is no lag in the work circuit I employ a circuit of high ohmic resistance containing the coils $a$, the resistance being introduced either in the coils or in the form of an external resistance R in series therewith. By this means the current flowing through the coils *a* can be easily made to lag less than 50 degrees behind the impressed E. M. F. I then cause the current in the coils *b* to lag behind its impress E. M. F. by an angle equal to the current lag in the coils *a*. I preferably bring this about by shunting the coils *b* by a suitable non-inductive resistance S. By selecting proper values for the resistances R and S in accordance with the well known laws governing the action of currents in divided circuits, the same degree of current lag in the coils *a* and *b* can easily be obtained. If the currents in the coils *a* and *b* have been so adjusted that they are of the same phase when the work current does not lag there being no interaction between the two torque producing reactions, the torque of the motor will be proportional to the energy consumed in the work circuit whatever the power factor may be. Thus when the current in the work circuit lags behind its electromotive force, the magnetizing forces of the windings of the motors are respectively equal to the vector sum of $a+b$, which varies with the angle $\theta$ between the currents in the two coils, and the vector sum of $a-b$, which also varies with that angle. The torques produced by the two motors individually are proportional to the squares of these quantities, which squares are, respectively $a^2+b^2+2ab \cos\theta$ and $a^2+b^2-2ab \cos\theta$. The resultant torque is therefore proportional to the difference between these squares or to $4ab \cos\theta$. Since *a* is proportional to the E. M. F. and *b* is proportional to the current, $4ab \cos\theta$ is proportional to the true energy consumed in the work circuit whatever the power factor of that circuit may be. The resultant torque is therefore proportional to the real energy consumed even when the work current lags.

It is not necessary to employ two separate disks provided that the currents induced by one magnet cannot react upon the other to produce torque. I prefer, however, to employ two disks because it is easier to avoid any such disturbing interaction. The following elements are therefore necessary for the proper measurement of the energy of alternating currents by my invention: First—the resultant torque of the instrument must be due to the difference of the individual torques of two motor reactions each of which is proportional to the square of the flux producing it. Second—the fluxes produced in the two motor reactions must be respectively proportional to the sum and difference of the magnetizing currents representing the E. M. F. and current to be measured. Third—the magnetizing forces of these currents must coincide in phase when the power factor of the circuit to be measured is unity. Fourth—each torque producing reaction must be independent and uninfluenced by the other, so that the phase relation of the two resultant fluxes may be immaterial and without influence upon the torque produced.

Figs. 3 and 4 show a motor operating upon the same principles as one of the motor elements of the meter. In this device G G are two magnet cores having opposing poles and provided with an energizing winding *g*, the opposing poles being wound so as to have opposite polarity. H is a disk or secondary element rotatably mounted and so arranged as to receive a current induced within it by the induction of the primary coil *g*. These secondary currents are symmetrically disposed with reference to the poles as shown in the drawings.

J J' are two magnetic circuits of low reluctance embracing the disk, and so placed as to receive the maximum induction from the secondary or induced currents. These circuits are placed upon opposite sides of the primary inducing magnets, so as to produce assisting torques upon opposite sides of the disk and thereby coöperate in producing rotation. The torque developed upon the disk by the reaction of the induced currents and the fields which they produce is, as before, proportional to the product of these two quantities, that is to say, is proportional to the square of the value of the secondary or induced currents. Such a device is, therefore, designed to have a very low resistance secondary circuit in order that the induced currents may have a maximum value and the torque produced be as great as possible, and, therefore, the design and construction of this motor differ from those employed heretofore in the art, where the reactions taking place are dependent upon the phase relation of the induced current to the primary or inducing fields, and where such phase relationship limits the value of the secondary currents employed.

It will be understood that while I have illustrated and explained my invention with reference to specific embodiments thereof, I do not desire to be limited to any mere details of construction or arrangement. I believe myself to be the first to provide a motive device, whether to be used for meters or for other purposes, in which the torque is produced on the attraction principle herein described, or wherein the torque produced is dependent upon the reaction of the induced currents upon their own field and entirely independent of any reaction that includes the flux of the primary inducing magnet. Moreover I believe myself to be the first to have ascertained and properly applied the factors that must be employed in order that a meter employing torques created by the square law shall, whatever the power factor of the circuit, accurately measure the true energy consumed therein.

Having thus described my invention, what I claim as new and desire to secure by Letters Patent is:—

1. The combination of an alternating current electro-magnet, a secondary element in inductive relation thereto, and a member of low magnetic reluctance adjacent to the secondary element and in torque-producing relation thereto, said member forming a magnetic circuit closed outside the secondary element.

2. The combination of an alternating current electro-magnet, a secondary element in inductive relation thereto, and a member of low magnetic reluctance adjacent to the secondary element, and at one side of said magnet and in torque-producing relation thereto, said member forming a magnetic circuit closed outside the secondary element.

3. The combination of an alternating current electro-magnet, a secondary element in inductive relation thereto, and a member of low magnetic reluctance embracing said secondary element and in torque-producing relation thereto, said member forming a closed magnetic circuit outside said secondary element.

4. The combination of an alternating current electro-magnet, a secondary element in inductive relation thereto, and means for providing a closed magnetic path outside the secondary element for a part of the magnetic circuit of the flux produced by the secondary currents.

5. In a wattmeter, the combination of a rotating system, electro-magnets in inductive relation thereto, wound so as to produce fluxes proportional to the vector sum and vector difference of magnetizing forces proportional to the potential and volume of current in the work-circuit, so disposed that each magnet is independent of the other so far as torque-producing relations are concerned, and low magnetic reluctance members adjacent to the system in torque-producing relation thereto and forming closed magnetic circuits around the system.

6. In a wattmeter, the combination of two disks mechanically connected, alternating-current electro-magnets in inductive relation to each disk, and members of low magnetic reluctance adjacent to each disk in torque-producing relation thereto and forming closed magnetic circuits outside of the disk.

7. In a wattmeter, the combination of two disks mechanically connected, electro-magnets in inductive relation to each disk, inducing in one disk currents varying with the sum and in the other disk varying with the difference of magnetizing forces proportional to the potential and volume of current in the work circuit, and members of low magnetic reluctance forming a magnetic circuit closed outside of each disk and in such relation thereto as to produce torques of opposing direction in each disk.

WILLIAM STANLEY.

Witnesses:
JOHN O. GEMPLER,
EDWIN SEGER.